US011760580B1

(12) United States Patent
Gomez et al.

(10) Patent No.: US 11,760,580 B1
(45) Date of Patent: Sep. 19, 2023

(54) MONITORING CONVEYOR SYSTEMS WITH SENSOR(S) ARRANGED PARALLEL TO FLOW DIRECTION

(71) Applicant: Amazon Technologies, Inc., Seattle, WA (US)

(72) Inventors: German Valle Gomez, Viladecavalls (ES); Carlos Martinez Navarro, Badalona (ES); Marcial Francisco Mosqueda Otero, Madrid (ES); Alan Sanchez Montero, Sant Boi de Llobrega (ES); Ivan Ortega Gonzalez, Barcelona (ES)

(73) Assignee: Amazon Technologies, Inc., Seattle, WA (US)

( * ) Notice: Subject to any disclaimer, the term of this patent is extended or adjusted under 35 U.S.C. 154(b) by 164 days.

(21) Appl. No.: 17/360,116

(22) Filed: Jun. 28, 2021

(51) Int. Cl.
*B65G 43/08* (2006.01)
*G05B 19/4155* (2006.01)
*G05B 19/416* (2006.01)
*B65G 47/22* (2006.01)

(52) U.S. Cl.
CPC ........... *B65G 43/08* (2013.01); *G05B 19/416* (2013.01); *G05B 19/4155* (2013.01); *B65G 47/22* (2013.01); *B65G 2203/0233* (2013.01); *B65G 2203/0266* (2013.01); *B65G 2203/044* (2013.01); *B65G 2811/093* (2013.01); *G05B 2219/45054* (2013.01)

(58) Field of Classification Search
CPC .................... B65G 43/08; B65G 47/22; B65G 2203/0266; B65G 2203/044; B65G 2811/093; B05B 19/4155; B05B 19/416; B05B 2219/45054
See application file for complete search history.

(56) References Cited

PUBLICATIONS

Kawaguchi, D.M., Intelligent Tracking System And Method And System Thereof, Mar. 26, 2021, China, CN 112567637 A, (for pertinent pages see Non-Final Rejection) (Year: 2021).*
Prasad, System for Inventory Tracking, May 28, 2021, U.S.A., WO2022/251452, (for pertinent pages see Non-Final Rejection) (Year: 2021).*
CN112567637A (Year: 2021).*

* cited by examiner

*Primary Examiner* — Gene O Crawford
*Assistant Examiner* — Lester Rushin, III
(74) *Attorney, Agent, or Firm* — Lee & Hayes, P.C.

(57) ABSTRACT

Systems and methods monitor a conveyor system to determine whether packages are at risk of falling off or jamming. Sensor(s), such as emitters, emit signals in a direction along a longitudinal length of the conveyor system, such as parallel to a flow of packages. Additional sensor(s), such as receivers, are arranged to receive the signals. In instances where the signals are received by the receivers, the packages may be properly positioned on the conveyor system and may not be at risk of falling off and/or jamming. However, if the signals are not received, this may be indicative of the packages being improperly positioned on the conveyor system. In such instances, the conveyor system may come to a stop, may slow in speed, and/or personnel may be instructed to reposition the packages on the conveyor system.

20 Claims, 7 Drawing Sheets

MONITORING CONVEYOR SYSTEMS WITH SENSOR(S) ARRANGED PARALLEL TO FLOW DIRECTION

BACKGROUND

Conveyor systems, such as belts, rollers, and the like are widely used for transporting goods from one location to another. For example, within shipping, sorting, or processing facilities, conveyor systems may transport packaged goods for shipment and/or distribution. The efficiency at which conveyor systems move packages is diminished when they become jammed. In such instances, conveyor systems may be shut down until the jam is cleared. Additionally, unstable or improperly positioned packages on the conveyor systems may result in downtime and/or lead to such jams. Still, jammed conveyor systems, as well as unstable or improperly positioned packages, pose inherent safety risks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features. The systems depicted in the accompanying figures are not to scale and components within the figures may be depicted not to scale with each other.

DETAILED DESCRIPTION

Figure 1:
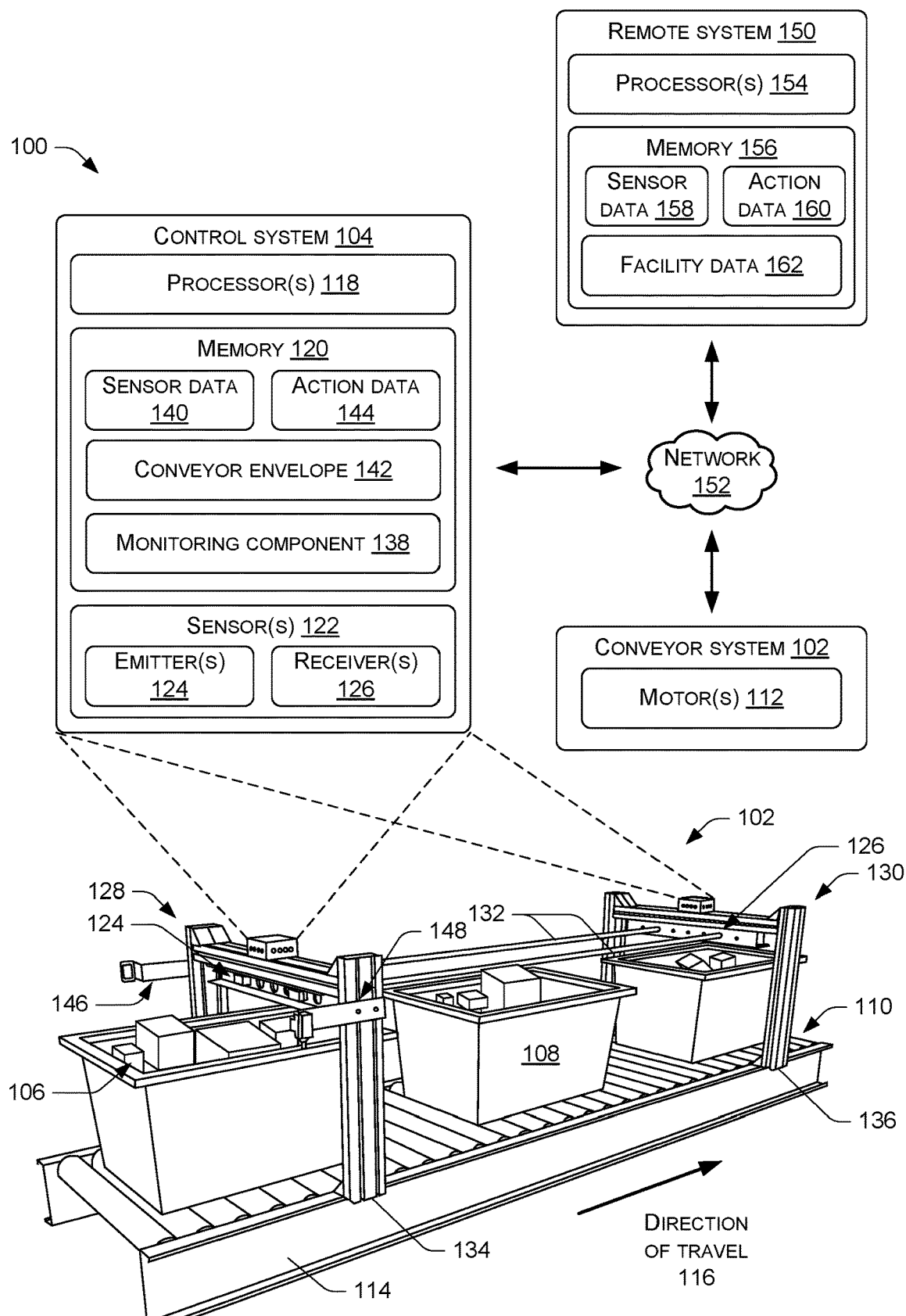
FIG. 1 illustrates an example environment that includes a conveyor system operating within a facility, according to an embodiment of the present disclosure. In some instances, the facility may represent a material handling facility in which item(s) are sorted, packaged, and/or otherwise prepared for shipment. One or more sensor(s) may be arranged to detect whether packages located on the conveyor system are improperly positioned, are at risk of falling off the conveyor system, and/or are susceptible to jamming the conveyor system. In such instances, one or more action(s) may be performed to prevent the packages falling off or jamming the conveyor system.

This application describes, in part, systems and methods for increasing productivity and safety within a material handling facility. In some instances, the systems and methods described herein may utilize a plurality of sensors to capture data associated with conveyor systems placed throughout the material handling facility. The sensors, for example, may include emitters and receivers that image packages transported along the conveyor systems. As the packages traverse the conveyor system the sensors may detect whether the packages are misaligned, out of position, extend beyond a perimeter of the conveyor system, or are otherwise improperly positioned. For example, the packages may extend over a side of the conveyor system or extend beyond a ceiling height above the conveyor system. In such instances, the packages may pose safety risks (e.g., failing overhead) and/or may lead to the conveyor system becoming jammed. When the packages (or other items) are determined to be improperly positioned, one or more action(s) may be performed to prevent the package falling or otherwise jamming the conveyor system. For example, the conveyor system may come to a stop while packages are repositioned or secured. Therein, the conveyor system may resume transporting packages with increased safety and productivity.

In some instances, the material handling facility may represent a building, center, or hub where item(s) are sorted, packaged, or inducted for shipment. The material handling facility may include any number of conveyor systems, such as chutes, rollers, belts, wheels, and so forth for transporting the packages from one location to another. For example, as item(s) are packaged for shipment, the packages may travel along one or more conveyor systems for sorting to their final destination. However, it is to be understood that the systems and methods discussed herein may be implemented within other environments and/or in which item(s) other than packages are transported (e.g., goods, commodities, etc.).

The conveyor systems may be located about the facilities at a plurality of locations, such as overhead (e.g., aerial), on the ground, and so forth. The conveyor systems may include varying lengths, may be arranged in substantially straight lines, may include curves, bends, etc., and/or may include descending or ascending portions. In some instances, given the location of the conveyor systems, packages being transported via the conveyor systems may pose safety risks. For example, overhead or aerial conveyor systems disposed vertically above a field in which workers package item(s), induct packages, and so forth may be at risk from falling packages. Here, the sensor(s) may be arranged to detect such packages or other packages that are at risk of falling.

In some instances, the sensor(s) may be disposed along the conveyor system for detecting when packages are misaligned or otherwise improperly positioned on the conveyor system. For example, the sensor(s) may be disposed vertically above the conveyor system on which the packages travel for detecting when the packages extend beyond a ceiling, canopy, or certain height above the conveyor system. Additionally, or alternatively, the sensor(s) may be disposed along lateral sides of the conveyor systems for detecting when the packages extend beyond edges or sides of the conveyor system. More generally, however, the conveyor system may be associated with an envelope within which packages are transported and the sensor(s) are arranged to detect when packages, or a portion thereof (e.g., sides, top, corners, edges, etc.) extend beyond the envelope.

The sensor(s) may include a plurality of emitters and receivers, where the emitters are arranged to emit signals and the receives are arranged to receive the emitted signals. In instances where the packages are properly positioned on the conveyor systems, within the envelope, the receivers may receive the emitted signals. However, in instances where the packages are not properly positioned, such as extending beyond a certain height above the conveyor systems, outside of the envelope, one or more of the receivers may not receive the emitted signals. For example, an improperly positioned package may block an emitted signal being received by the receiver. In such instances, the lack of receipt of the signal by the receiver may indicate that a package is improperly positioned and, as a result, the conveyor system may come to a stop. This may avoid the package falling from the conveyor, colliding with other structures within the material handling facility, and/or leading to a jam within the conveyor system. However, other action(s) may be taken in the event that a package is determined to be improperly positioned, such as outputting alerts (e.g., visual, audible, etc.), providing notifications to operators, scheduling repair, dispatching technicians, slowing a rate at which the conveyor system travels, actuating robotic arms to reposition the package, and so forth.

The emitters and the receives may be spaced apart from one another along the longitudinal length of the conveyor system. For example, in some instances, the emitters may be located upstream of the receivers. However, a position of the emitters and/or receivers may be interchangeable. Regardless, the emitters may be located at one end of the conveyor system (or a portion thereof) and the receivers may be located at another end of the conveyor system (or a portion thereof), spaced apart in a direction along the longitudinal length. As such, the emitters and receivers are arranged to detect improperly positioned packages along the longitudinal length of the conveyor system.

In some instances, the sensor(s) are arranged on frameworks (e.g., gantry) that are coupled to the conveyor system. For example, frameworks may dispose the sensor(s) vertically above the conveyor system and the frameworks may directly couple to the conveyor system (or a body thereof), as compared to other structures or a ground surface within an environment of the conveyor system. The frameworks may align the emitter(s) and receiver(s) with one another, whereby the emitter(s) output the signals in a direction towards the receiver(s) and the receiver(s) are oriented to receive the signals. The frameworks to which the emitter(s) and the receiver(s) couple may therefore serve to horizontally and vertically align the emitter(s) and the receiver(s), respectively.

In some instances, a series of conveyor systems may be placed in parallel or series and the emitters and receivers may be positioned along respective lengths of the conveyor system. For example, a first set of emitters and receivers may monitor a first portion of a conveyor system, and a second set of emitters and receivers may monitor a second portion of the conveyor system. Moreover, a first set of emitters and receivers may monitor a first conveyor system, a second set of emitters and receivers may monitor a second conveyor system, and so forth.

In some instances, the sensor(s) may be arranged to emit signals (e.g., light, sound, etc.) along a longitudinal length or flow path of the conveyor system, in a direction of travel in which the packages traverse the conveyor system. In other words, the emitters may be arranged to output a signal in a direction that is substantially parallel or orthogonal to a direction of travel (or flow path) associated with the conveyor system. Arranging the sensor(s) in this manner may reduce the number of sensor(s) used to determine improperly positioned packages. That is, having the sensor(s) arranged to emit signals along the longitudinal length or in a direction of the flow path of the conveyor system, as compared to laterally arranged along the conveyor system, transverse (e.g., orthogonal) to the direction of travel, reduces the number of sensor(s) to detect when packages are misaligned. In some instances, the sensor(s) may be arranged to monitor conveyor system(s) up to approximately two hundred meters.

In some instances, a plurality of sensors may be arranged above the conveyor system and/or along sides of the conveyor system. For example, packages may be of varying sizes and the number of sensor(s) disposed or otherwise activated may be based on the size of packages being handled by the conveyor systems. By way of example, for conveyor systems handling smaller packages, a greater number of sensors may be used than in instances where the conveyor systems handles larger packages. The greater number of sensor(s), for example, may increase a granularity of detecting packages that are improperly positioned. For example, by using a greater number of sensors, smaller packages may be detected in instances where the packages extend beyond a height or sides of the conveyor systems. In some instances, any number of emitters and receivers, or pairs of emitters and receives, may be used (e.g., one, two, four, eight, twelve, etc.). The number of emitters and/or receivers used, for example, may additionally or alternatively be based at least in part on a width of the conveyor system, a length of the conveyor system, a speed at which the conveyor system moves packages, and so forth.

The sensor(s) may be configured to output and receive signals at different frequencies to reduce noise. For example, a first emitter may emit a first signal having a first frequency for receipt by a first receiver, a second emitter may emit a second signal having a second frequency for receipt by a second receiver, and so forth. In some instances, the first emitter and the second emitter may be positioned adjacent to one another at a first end of the conveyor system, and the first receiver and the second receiver may be positioned adjacent to one another at a second end of the conveyor system. However, given the different frequencies, the first receiver may determine whether the first signal was received and the second receiver may determine whether the second signal was received. The variation in frequencies serves to avoid the first receiver and the second receiver detecting signals emitted by other emitters. For example, it is envisioned that over the longitudinal length of the conveyor system, noise may be introduced into the signals and/or the receivers may detect noise within the emitted signals and/or receive signals emitted by other emitters. The first receiver, for example, may receive the second signal, but not the first signal. However, given that the first receiver did not receive the first signal (of the first frequency), a package may be determined to be improperly positioned. That is, if the first receiver did not receive the correct signal (of the first frequency), this may indicate that an obstruction is present between the first emitter and the first receiver. In such instances, a receipt of another signal may indicate that the first receiver did not receive the proper signal or did not receive a signal at all. These determinations indicate that an obstruction is present between one or more of the emitters and the receivers. Therefore, including signals of different frequencies allows for the sensor(s) to accurately determine whether packages are properly or improperly positioned.

In some instances, the sensor(s) may include infrared (IR) sensors that emit light. However, other sensor(s) and/or the signals may be used (e.g., sound, magnetic, radio, etc.). More generally, the signals may be encoded with certain identifiers to determine whether the receivers receive respective emitted signals.

The system and methods disclosed herein therefore provide techniques for determining packages that pose safety risks from falling and/or reduce productivity via jamming. The sensor(s) are arranged to monitor a longitudinal length or flow path of the conveyor system for determining whether packages become improperly positioned. In such instances, one or more actions may be taken to reduce a likelihood of the package falling of the conveyor system and/or to prevent the package causing a jam. Such actions increase a safety within the material handling facility and improves productivity.

The present disclosure provides an overall understanding of the principles of the structure, function, device, and system disclosed herein. One or more examples of the present disclosure are illustrated in the accompanying drawings. Those of ordinary skill in the art will understand that the devices and/or the systems specifically described herein and illustrated in the accompanying drawings are non-limiting embodiments. The features illustrated or described in connection with one embodiment may be combined with the features of other embodiments. Such modifications and variations are intended to be included within the scope of the appended claims.

FIG. 1 illustrates an example environment 100 including a conveyor system 102 and a control system 104. In some instances, the environment 100 may correspond to an order fulfillment center or facility in which orders are sorted or otherwise fulfilled, processed, and/or categorized for shipment. Although not shown, the environment 100 may include inventory for shipment. Generally, the inventory stores an inventory of items (e.g., clothing, electronics, toys, household goods, etc.). In some instances, the items may be stored in bins, slots, shelves, containers, crates, stalls, racks, etc. The inventory may be dispersed about the environment 100 and/or may be located in dedicated areas of the environment 100 (e.g., perimeter). Additionally, or alternatively, in some instances, the inventory may be located separate from the environment 100. Furthermore, in some instances, the environment 100 may not include the inventory, such as in a sortation center or cross-docking station. Here, the environment 100 may receive previously packaged items for further sortation and/or delivery to a variety of destinations.

As orders are processed for shipment, the orders (e.g., packages, parcels, etc.) may be conveyed or otherwise transported within the environment 100 via the conveyor system 102. Although the discussion herein relates to a single conveyor system, it is to be understood that the environment 100 (or other environments) may include any number of conveyor systems. Generally, the conveyor system 102 may assist in transporting orders, goods, packages, etc. from one location to another within the environment 100. For example, after orders are packaged, packages 106 may be routed by the conveyor system 102 for shipment and/or sortation. In some instances, the packages 106 may be placed within bins 108 located atop the conveyor system 102. The bins 108 may be sized to receive any number of packages and may be rectangular, cylindrical, and so forth. The bins 108 are shown having an open top to allow the packages 106 to be placed therein. Additionally, or alternatively, in some instances, the packages 106 may be placed directly onto the conveyor system 102 and the use of the bins 108 may be omitted.

The conveyor system 102 is shown including rollers 110 that rotate to convey the bins 108. In some instances, the rollers 110 may be powered via one or more electric motors 112 (e.g., DC motor). However, the conveyor system 102 may additionally or alternatively include wheels, belts, and the like that rotate or otherwise translate for conveying the bins 108 (or the packages 106) along a length of the conveyor system 102. The rollers 110 (or the wheels, belts, etc.) may form a deck associated with the conveyor system 102, along which the bins 108 travel.

The conveyor system 102 is further shown including a frame 114 to which the rollers 110 couple (e.g., rotatably mount). The frame 114 provides structural rigidity to the conveyor system 102. Furthermore, other components may also couple to the frame 114, such as the one or more electric motors 112, cross-members, and so forth. Additionally, the conveyor system 102 may include components not illustrated, such as sidewalls or dividers, and/or may be shaped differently than illustrated. For example, the conveyor system 102 may include turns, may ascend or descend in elevation, and so forth. The conveyor system 102 may also be disposed throughout the environment 100, such as along a ground floor, overhead, along walls, and so forth. In some instances, the conveyor system 102 may traverse multiple floors, mezzanines, or levels within the environment 100.

The conveyor system 102 conveys the bins 108 in a direction of travel 116, as indicated by the arrow in FIG. 1. The direction of travel 116 may be in a direction parallel to or along a longitudinal length of the conveyor system 102. For example, the conveyor system 102 may span a longitudinal length and the conveyor system 102 (e.g., via the rollers 110 and the motor(s) 112) is configured to convey the bins 108 at least partially along the longitudinal length. More generally, however, the conveyor system 102 may move the packages 106 and/or the bins 108 along a flow path.

The control system 104 serves to monitor the packages 106 and/or the bins 108 along the longitudinal length of the conveyor system 102 to determine whether the packages 106 and/or the bins 108 are out of position, misaligned, and/or improperly positioned. For example, from time to time, the packages 106 and/or the bins 108 may become reoriented, rearranged, and so forth on the conveyor system 102. That is, although the bins 108 in FIG. 1 are shown being generally aligned within a center of the conveyor system 102, parallel to the direction of travel 116, the packages 106 and/or the bins 108 may shift during transport. In these instances, the bins 108 may be at risk of falling off the conveyor system 102, contacting other structures within the environment 100 (e.g., facility structural supports), other components of the conveyor system 102, and so forth. Moreover, the packages 106 within the bins 108 may similarly fall out of the bins 108 and/or off the conveyor system 102. Depending on the location of the conveyor system 102, falling packages 106 and/or bins 108 may result in injuries to personnel within the environment 100. For example, in instances where the conveyor system 102 is located overhead, or above a working area within the environment 100, falling packages 106 and/or bins 108 may result in injuries to personnel working below.

Additionally, in instances where the packages 106 and/or bins 108 fall, the bins 108, the packages 106, and/or the items within the packages 106 themselves may be damaged.

Still, in instances where the packages 106 and/or the bins 108 are improperly positioned, the conveyor system 102 may become jammed. In such instances, a productivity and/or throughput of the conveyor system 102 may be reduced. For example, in instances where the conveyor system 102 becomes jammed, the packages 106 and/or the bins 108 may be restricted from traversing along the conveyor system 102. Accordingly, as will be explained herein, the control system 104 serves to monitor the packages 106 and/or the bins 108 to determine whether there are safety risks and/or instances that may lead to reduced productivity.

The control system 104 is shown including processor(s) 118 and memory 120, where the processor(s) 118 may perform various functions and operations associated with monitoring the conveyor system 102 and the memory 120 may store instructions executable by the processor(s) 118 to perform the operations described herein. The control system 104 includes sensor(s) 122 that are arranged to capture data associated with the packages 106 and/or the bins 108 on the conveyor system 102. For example, the sensor(s) 122 may include photoelectric sensors. Example photoelectric sensors may be manufactured by the Banner Engineering Corporation of Minneapolis, Minn. In some instances, the sensor(s) 122 may represent emitter(s) 124 that are configured to emit signals and receiver(s) 126 that are configured to receive the emitted signals. Example emitter(s) 124 may include, for example, infrared (IR) emitter(s). In some instances, the sensor(s) 122 may be configured to output and detect IR light between 300 GHz-400 THz. The sensor(s) 122 may be capable of detecting the signals 132 over long ranges, such as up to two hundred meters. However, although discussed herein with regard to emitting light, the sensor(s) 122 may be configured to emit or generate a plurality of signals for use in monitoring the packages 106 and/or the bins 108. For example, emitted signals may include sound or electromagnetic waves.

Generally, the sensor(s) 122 are arranged to monitor whether the packages 106 and/or the bins 108 become improperly positioned on the conveyor system 102. Whether the packages 106 and/or the bins 108 become improperly positioned may be based on the packages 106 and/or the bins 108 extending beyond an envelope associated with the conveyor system 102. The envelope, for example, may be associated with a width (e.g., lateral direction perpendicular to the direction of travel 116), a length (e.g., longitudinal direction parallel to the direction of travel 116), and/or a height (e.g., transverse direction perpendicular to the direction of travel 116). More generally, the envelope may correspond to a virtual height, width, length, etc., such as a boundary, perimeter, or an area (e.g., rectangle, square, etc.). If the packages 106 and/or the bins 108 extend beyond the envelope, then the packages 106 and/or the bins 108 may be determined to be improperly positioned. In such instances, the packages 106 and/or the bins 108 may be at risk of falling off the conveyor system 102, jamming the conveyor system 102, contacting other structures, components, etc. within the environment 100 and/or on the conveyor system 102, and so forth. To monitor whether the packages 106 and/or the bins 108 extend beyond the envelope, the sensor(s) 122 are accordingly arranged to determine whether the packages 106 and/or the bins 108 extend beyond the envelope. In some instances, the sensor(s) 122 may be arranged to monitor sides of the conveyor system 102 (e.g., laterally) and/or a top of the conveyor system 102 (e.g., ceiling, a vertical distance above the conveyor system 102, etc.).

For example, referring to FIG. 1, the emitter(s) 124 may be positioned at a first end 128 of the conveyor system 102 and the receiver(s) 126 may be positioned at a second end 130 of the conveyor system 102. The first end 128 and the second end 130 are spaced apart in a direction along a longitudinal length of the conveyor system 102 (e.g., in a direction associated with the direction of travel 116). Here, the emitter(s) 124 are arranged to output signals 132 in a direction associated with the direction of travel 116 and the receiver(s) 126 are arranged to detect, or receive, those emitted signals 132. The emitter(s) 124, more generally, may be arranged to output the signals 132 in a direction along a flow path of the conveyor system 102. In some instances, the emitter(s) 124 and the receiver(s) 126 may be spaced apart by various distances, such as ten meters, fifty meters, one hundred meters, and so forth. In some instances, however, the emitter(s) 124 and the receiver(s) 126 may be spaced apart up to two hundred meters or greater than two hundred meters.

In some instances, the emitter(s) 124 may be disposed on a first framework 134, vertically above the rollers 110 at the first end 128. Similarly, in some instances, the receiver(s) 126 may be disposed on a second framework 136, vertically above the rollers 110 at the second end. The first framework 134 and/or the second framework 136 may couple to the frame 114. As arranged, and as shown in FIG. 1, the sensor(s) 122 are configured to detect whether the packages 106 and/or the bins 108 extend beyond a certain ceiling height (or upper perimeter) of the conveyor system 102. That is, the sensor(s) 122 are arranged to determine whether the packages 106 and/or the bins 108 extend beyond a threshold distance above the rollers 110 (or conveyor or deck of the conveyor system 102).

The emitter(s) 124 emit the signals 132 (e.g., IR light) in a direction towards the receiver(s) 126. In instances where the packages 106 and/or the bins 108 are properly positioned, so as to be located below the ceiling height associated with the conveyor system 102, the signals 132 are received by the receiver(s) 126. However, in instances where the packages 106 and/or the bins 108 are improperly positioned, so as to be located above the ceiling height associated with the conveyor system 102, the signals 132 may not be received by the receiver(s) 126. Here, any number of pairs or sets of emitter(s) 124 and receiver(s) 126 may be used, such as one, two, three, four, eight, ten, twelve, etc. In some instances, each pair of emitters 124 and receivers 126 may detect whether a signal was received or whether a signal emitted from a corresponding emitter 124 was received. If a portion, a majority, and/or none of the signals 132 were received, the packages 106 and/or the bins 108 may be improperly positioned. If a portion of the signals 132 were not received, this may indicate that the packages 106 and/or the bins 108 may be improperly positioned on a certain side, or portion, of the conveyor system 102.

As shown in FIG. 1, two signals 132 are emitted. This is accomplished using a first emitter that emits a first signal and a second emitter that emits a second signal. However, as noted above, the control system 104 may include more than or less than two emitters, and additional emitters may be arranged to emit signals along sides of the conveyor system 102. As the emitter(s) 124 emit the signals 132, the receiver(s) 126 receive the signals 132. For example, a first receiver may receive the first signal emitted by the first emitter, and a second receiver may receive the second signal emitted by the second emitter. In instances where the first receiver receives the first signal and the second receiver receives the second signal, this may indicate that the packages 106 and/or the bins 108 do not extend beyond the ceiling. However, in instances where the packages 106 and/or the bins 108 are improperly positioned, and extend beyond the ceiling, the first signal and/or the second signal may not be received by the first receiver and the second receiver, respectively. In such instances, the packages 106 and/or the bins 108 may be at risk of falling from the conveyor system 102 and/or jamming at the conveyor system 102.

To determine whether the signals 132 are received, the control system 104 is shown including a monitoring component 138. The monitoring component 138 has access to sensor data 140 stored in the memory 120, which is generated by the sensor(s) 122. For example, the sensor data 140 may indicate the signals 132 that were generated by the emitter(s) 124, whether the signals 132 were received by the receiver(s) 126, a time associated with the signals 132 being emitted, a number of signals 132 emitted, and so forth. As such, the sensor data 140 may be used to indicate the signals 132 that were emitted by the emitter(s) 124 and the signals 132 that were received by the receiver(s) 126. In instances where the receiver(s) 126 (or a portion thereof) do not receive the signals, the sensor data 140 may include an indication of such. This allows the monitoring component 138 to determine instances where signals 132 were not received by the receiver(s) 126.

The monitoring component 138 may also have access to a conveyor envelope 142 that is associated with the envelop of the conveyor system 102, or an area, perimeter, or boundary in which the sensor(s) 122 are arranged to monitor. In instances where the monitoring component 138 determines that signals 132 were not received by the receiver(s) 126, the monitoring component 138 may determine that the packages 106 and/or the bins 108 are improperly positioned. For example, the monitoring component 138 may determine that the first receiver did not receive the first signal and/or that the second receiver did not receive the second signal. In such instances, the packages 106 and/or the bins 108 may interfere, block, or otherwise obstruct the first signal and/or the second signal being received by the first receiver and the second receiver, respectively. For example, one of the bins 108 may be improperly positioned on its end, so as to extend beyond the envelope. As shown in FIG. 1, the signals 132 are shown being received by the receiver(s) 126 given that the bins 108 and the packages 106 do not extend above the envelope (or otherwise interfere with the signals 132). However, it is to be understood that in instances where the packages 106 and/or the bins 108 extend beyond the envelope, the signals 132 are obstructed from being received by the receiver(s) 126.

In instances where the monitoring component 138 determines that the signals 132 (or a portion thereof) are not received, the control system 104 may undertake one or more actions or cause one or more actions to be undertaken. These actions may be stored as action data 144 within the memory 120. The actions may include stopping the conveyor system 102 (e.g., via the motor(s) 112), slowing a speed of the conveyor system 102 (e.g., via the motor(s) 112), outputting one or more alerts or notifications (e.g., light, sound, messages, etc.), actuating one or more arms to reposition the packages 106 and/or the bins 108, and the like. Here, the monitoring component 138 may communicate with appropriate devices and/or systems, such as the conveyor system 102, for causing the conveyor system 102 to terminate actuation of the motor(s) 112 or slow in speed, for example. Therein, personnel or robotic agents may reposition the packages 106 and/or the bins 108 and the conveyor system 102 may resume operations. For example, after the packages 106 and/or the bins 108 are repositioned, the signals 132 may be received by the receiver(s) 126 and the monitoring component 138 may determine that the packages 106 and/or the bins 108 are properly positioned.

In some instances, the emitter(s) 124 and the receiver(s) 126 may be configured to emit and receive signals of different frequencies, respectively. For example, in the context of FIG. 1, the first signal emitted by the first emitter may have a first frequency (e.g., 3000 Hz) and the second signal emitted by the second emitter may have a second frequency (e.g., 3500 Hz). Configuring the first emitter and the second emitter in this manner (e.g., to emit different frequencies) may reduce noise introduced into the received signals. For example, it is contemplated that as the signals 132 are emitted by the emitter(s) 124, those signals 132 may bounce, reflect, refract, etc. off of objects (e.g., the bins 108, the packages 106, etc.) before being received by the receiver(s) 126. This scattering may introduces noise into the received signals 132. Moreover, in some instances, the first signal emitted by the first emitter may be received by the second receiver (e.g., through reflecting off of objects). Without varying the frequencies, the second receiver may detect a received signal and the monitoring component 138 may improperly determine a state of the packages 106 and/or the bins 108 on the conveyor system 102. However, by varying the frequencies of the signals, the monitoring component 138 is able to determine whether the signals 132 emitted by respective emitter(s) 124 were received by the respective receiver(s) 126. In other words, the monitoring component 138 is able to determine whether the first signal having a first frequency is received by the first receiver configured to detect the first frequency, whether the second signal having a second frequency is received by the second receiver configured to detect the second frequency, and so forth. In such instances, the emitter(s) 124 and receiver(s) 126 may be programmed or otherwise configured to emit signals and detect signals of a given frequency.

As noted above, the control system 104 may include any number of emitter(s) 124 and receiver(s) 126. In some instances, the control system 104 may modulate or dynamically adjust the amount of emitter(s) 124 and receiver(s) 126 that are actuated (e.g., powered on). For example, for larger packages 106, less emitter(s) 124 and receiver(s) 126 may be used to detect improperly positioned packages 106 and/or bins 108. Comparatively, for smaller packages, a greater number of emitter(s) 124 and receiver(s) 126 may be used. That is, smaller packages 106 may be able to extend within a space between the signals 132. However, by increasing the amount of activated emitter(s) 124 and receiver(s) 126, a greater number of signals 132 may be used to monitor whether the packages 106 and/or the bins 108 extend beyond the envelope, for example. In some instances, the control system 104 may dynamically adjust the number of activated emitter(s) 124 and receiver(s) 126 based on the size of the bins 108, the size of the packages 106, a speed of the conveyor system 102, and the like.

In some instances, the sensor(s) 122 may be positioned before (e.g., upstream) of the first framework 134 to detect whether the packages 106 and/or the bins 108 will impact the first framework 134. For example, in FIG. 1, at least one sensor (e.g., emitter) is shown positioned on a first arm 146 that extends from the first framework 134 and at least another sensor (e.g., receiver) is shown positioned on a second arm 148 that extends from the first framework 134. As shown in FIG. 1, these sensor(s) 122 are arranged perpendicular to the direction of travel 116 for detecting whether the packages 106 and/or the bins 108 will contact the first framework 134 (e.g., whether the packages 106 and/or bins 108 may pass vertically underneath the first framework 134).

The control system 104 is shown being in communication with a remote system 150 and the conveyor system 102 via a network 152. In some instances, the remote system 150 may be implemented as one or more servers and may, in some instances, form a portion of a network-accessible computing platform implemented as a computing infrastructure of processors, storage, software, data access, etc. that is maintained and accessible via a network such as the Internet. The remote system 150 does not require end-user knowledge of the physical location and configuration of the system that delivers the services. Common expressions associated for the remote system 150 include "on-demand computing", "software as a service (SaaS)", "platform computing", "network-accessible platform", "cloud services", "data centers", etc. The control system 104 may communicatively couple with the remote system 150 given that the remote system 150 may have a computational capacity that far exceeds that of the control system 104.

The remote system 150 is shown including processor(s) 154 and memory 156, where the processor(s) 154 may perform various functions and operations associated with monitoring the conveyor system 102 and the memory 156 may store instructions executable by the processor(s) 154 to perform the operations described herein. In some instances, the remote system 150 may be capable of performing all, or a portion of, the operations described above with regard to the control system 104. For example, the memory 156 is shown storing sensor data 158, which may be the same as the sensor data 140 (or a portion thereof), and action data 160, which may be the same as the action data 144 (or a portion thereof). In some instances, the control system 104 may provide the sensor data 140 to the remote system 150, and the remote system 150 may determine whether the packages 106 and/or the bins 108 are improperly positioned. The remote system 150 may additionally, or alternatively, determine an appropriate action to take to control the conveyor system 102.

The memory 156 is further shown storing facility data 162, which may include information associated with the environment 100, or a facility corresponding to the environment 100. For example, the facility data 162 may indicate the conveyor systems within the environment 100, a type of the conveyor systems (e.g., roller, wheel, belt, etc.), a location of the conveyor systems, a length of the conveyor systems, a width of the conveyor systems, and so forth. Such information may be used when controlling the conveyor systems, determining a productivity of the conveyor systems, and so forth.

The control system 104, however, may additionally or alternatively communicatively couple to additional computing devices (e.g., personal devices such as a laptop, mobile phones, etc.), computing devices used by personnel within the environment 100 (e.g., tablet), and so forth. For example, in instances where a package is improperly positioned, an indication of such may be provided to personnel (e.g., tablet) within the environment 100. Therein, the personnel may reposition the package or otherwise cause the package to be properly positioned (e.g., providing an instruction to a robotic arm).

In some instances, the control system 104 may be mounted atop the first framework 134 and/or the second framework 136. For example, the control system 104 on the first framework 134 may cause the emitter(s) 124 to emit the signals 132, and the control system 104 on the second framework 136 may determine whether the receiver(s) 126 receive the signals 132. Such control systems may be communicatively coupled to one another, or resemble components of a single control system 104. Moreover, the control system 104 may not be located on the conveyor system 102, and may be remote from the conveyor system 102. In some instances, the emitter(s) 124 may be located upstream of the receiver(s) 126. However, in some instances, the emitter(s) 124 may be located downstream of the receiver(s) 126. For example, in reference to FIG. 1, the emitter(s) 124 may be mounted atop the second framework 136 and the receiver(s) 126 may be mounted on the first framework 134. Still, in some instances, any combination of emitter(s) 124 and receiver(s) 126 may be mounted on the first framework 134 and the second framework 136, respectively, so as long as corresponding emitter(s) 124 and receiver(s) 126 are aligned to emit and receive the signals 132, respectively.

In some instances, the environment 100 may include conveyor systems in communication with one another (e.g., placed in series, stacked end to end, etc.). Here, the environment 100 may include a network or a plurality of conveyor systems. In such instances, the control system 104 may in communication with any number of the conveyor systems. However, respective sensor(s) 122 may be arranged to monitor corresponding lengths of the conveyor systems. That is, the sensor(s) 122 may have a limited range (e.g., distance) for monitoring the packages 106 and/or the bins 108 on the conveyor system 102. For example, a first set of sensor(s) (e.g., emitter(s) 124 and receiver(s) 126) may be arranged to monitor a first portion of a conveyor system, and a second set of sensor(s) (e.g., emitter(s) 124 and receiver(s) 126) may be arranged to monitor a second portion of the conveyor system (or a second conveyor system). However, in instances where movement of one conveyor system is altered, preceding and/or subsequent conveyor systems may be altered as well. For example, if a first conveyor system is halted, a preceding second conveyor system may also be halted to avoid packages 106 and/or the bins 108 accumulating or piling up at a beginning of the first conveyor system.

The network 152 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The control system 104, the conveyor system 102, and the remote system 150 may include one or more network interface(s) for permitting communication over the network 152.

Although FIG. 1 schematically depicts the conveyor system 102, the control system 104, and the remote system 150 being separate, in some examples, the conveyor system 102, the control system 104, and/or the remote system 150 may be embodied within a single system.

As used herein, a processor, such as the processor(s) 118 and/or 154 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory, such as the memory 120 and/or 156 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
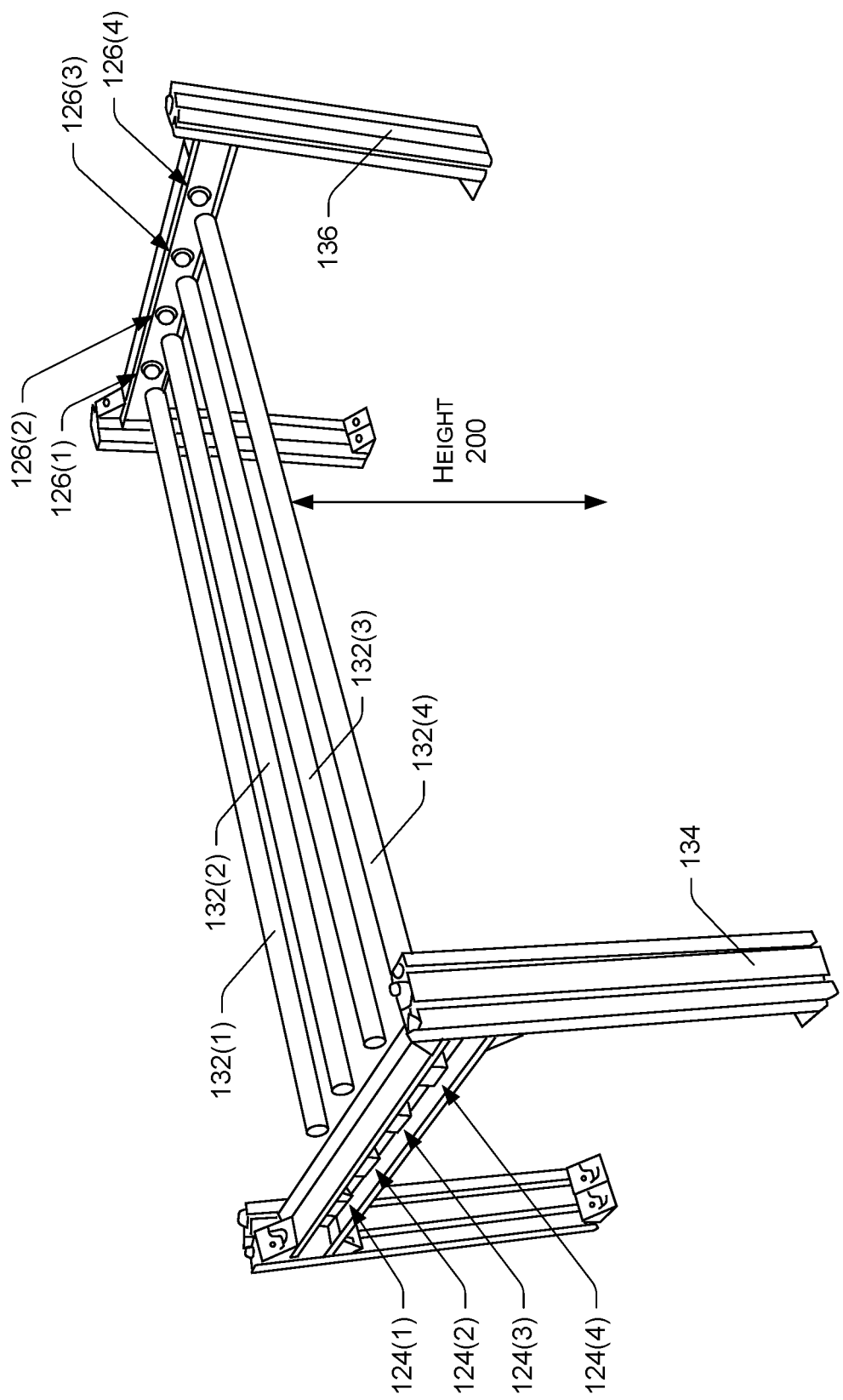
FIG. 2 illustrates example sensor(s) arranged to monitor packages on a conveyor system, according to an embodiment of the present disclosure.

FIG. 2 illustrates a detailed view of the sensor(s) 122 coupled to the first framework 134 and the second framework 136, respectively. As discussed above, the first framework 134 and the second framework 136 may be configured to receive any number of emitter(s) 124 and receiver(s) 126. The first framework 134 and the second framework 136, in some instances, are configured to couple to the frame 114 of the conveyor system 102 for disposing the sensor(s) 122 above the conveyor system. The first framework 134 and the second framework 136 may couple directly to the conveyor system 102 itself, as compared to a ground floor, ceiling, or other structures within an environment in which the conveyor system 102 resides.

FIG. 2 illustrates that four emitter(s) 124 couple to the first framework 134 and four receiver(s) 126 couple to the second framework 136. For example, the emitter(s) 124 may include a first emitter 124(1), a second emitter 124(2), a third emitter 124(3), and a fourth emitter 124(4). The first emitter 124(1) is arranged and configured to output a first signal 132(1), the second emitter 124(2) is arranged and configured to output a second signal 132(2), the third emitter 124(3) is arranged and configured to output a third signal 132(3), and the fourth emitter 124(4) is arranged and configured to output a fourth signal 132(4). The receiver(s) 126, include a first receiver 126(1), a second receiver 126(2), a third receiver 126(3), and a fourth receiver 126(4). The first framework 134 and the second framework 136 serve to align (e.g., horizontally and vertically) the emitter(s) 124 and the receiver(s) 126, respectively. In doing so, the emitter(s) 124 are oriented to emit the signals 132 in the direction towards the receiver(s) 126, and the receiver(s) 126 are oriented to receive the signals 132 from the emitter(s) 124.

In some instances, the first signal 132(1) may include a first frequency, the second signal 132(2) may include a second frequency, the third signal 132(3) may include a third frequency, and the fourth signal 132(4) may include a fourth frequency. Each of the frequencies may be different such that the first receiver 126(1) detects the first signal 132(1) emitted by the first emitter 124(1), the second receiver 126(2) detects the second signal 132(2) emitted by the second emitter 124(2), the third receiver 126(3) detects the third signal 132(3) emitted by the third emitter 124(3), and the fourth receiver 126(4) detects the fourth signal 132(4) emitted by the fourth emitter 124(4).

As further shown in FIG. 2, the emitter(s) 124 are arranged to emit the signals 132 at a certain height 200 above the conveyor system 102 (or deck of the conveyor system 102) for determining whether the packages 106 and/or the bins 108 vertically extend beyond the conveyor system 102 by a predetermined amount. In some instances, the height 200 may be adjusted through extending the first framework 134 and/or the second framework 136. The height 200 may be static, or predetermined, or may be dynamically adjusted based on the size of the packages 106 and/or the bins 108 being conveyed by the conveyor system 102.

Figure 3:
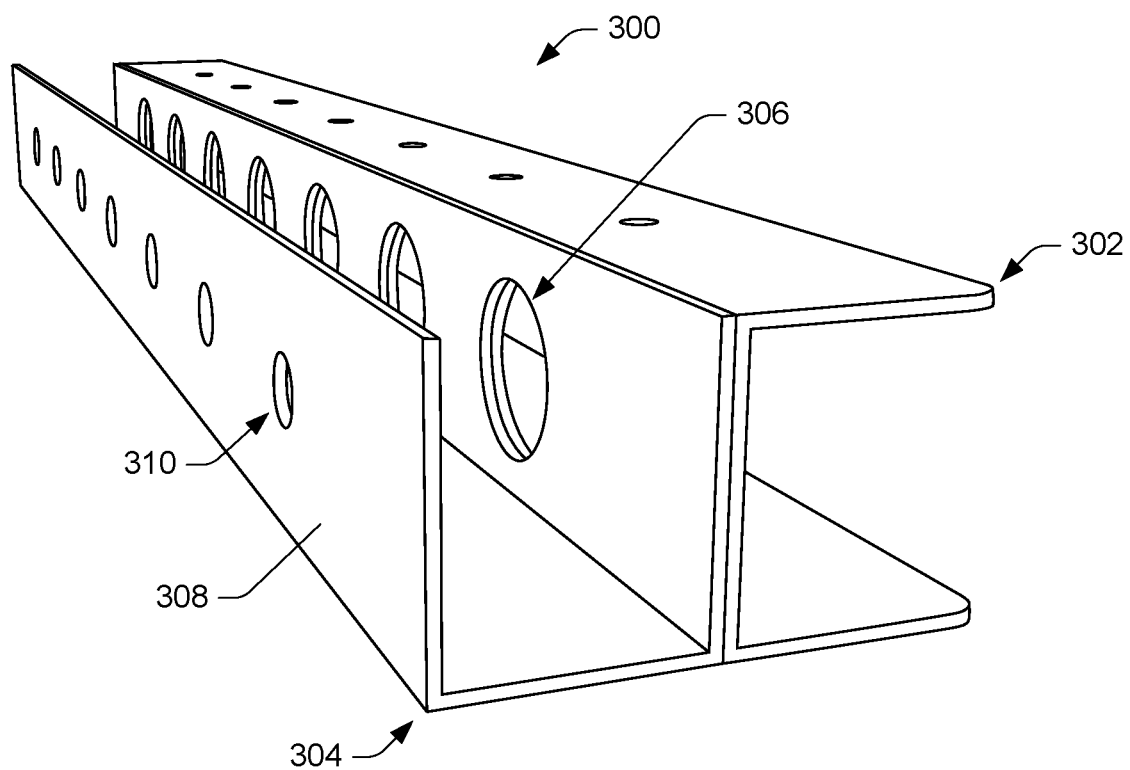
FIG. 3 illustrates an example frame to which one or more sensor(s) may couple, according to an embodiment of the present disclosure.

FIG. 3 illustrates an example bracket 300 that, in some instances, represents a component of the first framework 134 and/or the second framework 136. The bracket 300 serves to align the sensor(s) 122 to emit and receive the signals 132. For example, the emitter(s) 124 may couple to the bracket 300 (e.g., a first bracket) to emit the signals 132 in a direction towards the receiver(s) 126, and the receiver(s) 126 may couple to the bracket 300 (e.g., a second bracket) to receive the emitted signals 132. As such, the bracket 300 serves to align the emitter(s) 124 and the receiver(s) 126 with one another, respectively.

The bracket 300 may include a first portion 302 and a second portion 304 coupled together (e.g., welded, adhesives, fasteners, etc.). However, in some instances, the first portion 302 and the second portion 304 may represent a single, unibody, component. Suitable materials of the bracket 300 may include, for example, plastic, metal, composites, and/or any combination thereof.

A first passageway 306 is shown extending through the first portion 302 and the second portion 304. The first passageway 306 may receive at least a portion of a body of the emitter(s) 124 and the receiver(s) 126. For example, the emitter(s) 124 and/or the receiver(s) 126 may be placed at least partially through the first passageway 306. Therein, the emitter(s) 124 and/or the receiver(s) 126 may be fastened to the bracket 300 (e.g., using a lock nut). The bracket 300 may include any number of first passageways 306 that are spaced apart from one another along a longitudinal length of the bracket 300. For example, the bracket 300 is shown including seven first passageways 306. However, the bracket 300 may include more than or less than seven first passageways 306.

In some instances, the second portion 304 may include a flange 308 that has a second passageway 310. The second passageway 310 may be concentric with the first passageway 306. In some instances, the emitter(s) 124 may be arranged to output the signals 132 through the second passageway 310 for narrowing a beam width associated with the signals 132. The second passageway 310 may narrow the beam width of the signals 132 such that the signals 132 are capable of being received by the receiver(s) 126 over a range of the conveyor system 102 (e.g., two hundred meters). As shown, the second passageway 310 may include a diameter that is smaller than a diameter of the first passageway 306. The second passageway 310 may also align the signals 132 to be emitted towards the receiver(s) 126. Additionally, in some instances, the bracket 300 may include a corresponding number of second passageways 310 as the first passageways 306, where individual second passageways 310 and first passageways 306 are concentric. In some instances, a bracket to which the emitter(s) 124 mount may include the flange 308 (and therefore the second passageways 310), whereas a bracket to which the receiver(s) 126 mount may not include the flange 308.

Figure 4A:
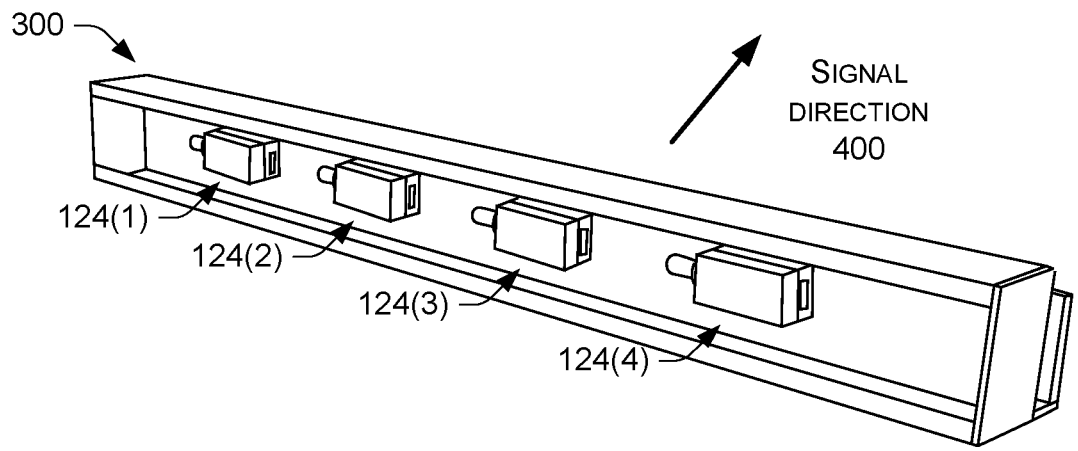
FIG. 4A illustrates example emitters coupled to the frame of FIG. 3, according to an embodiment of the present disclosure.
Figure 4B:
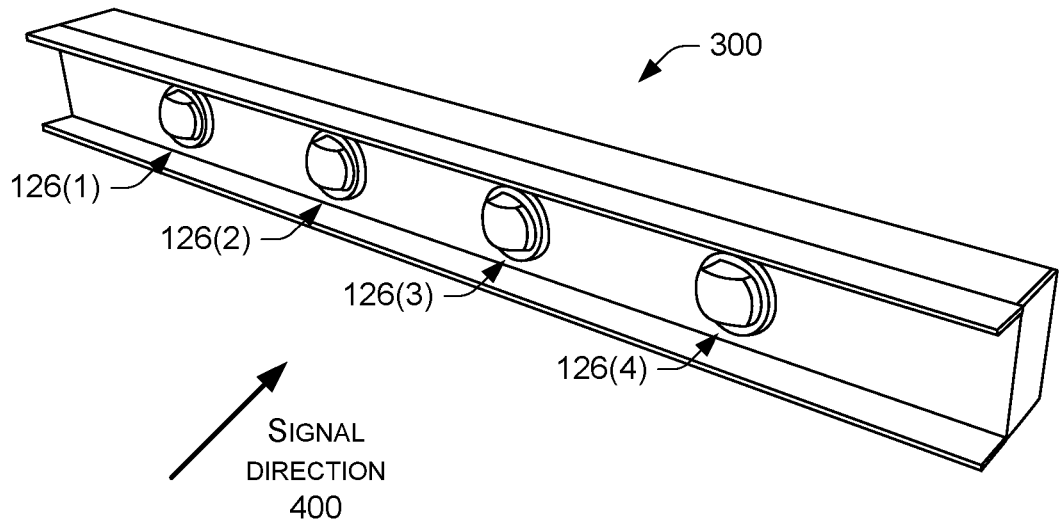
FIG. 4B illustrates example receivers coupled to the frame of FIG. 3 for receiving signals emitted by the emitters of FIG. 4A, respectively, according to an embodiment of the present disclosure.

FIGS. 4A and 4B illustrate the sensor(s) 122 coupled to bracket 300. In particular, FIG. 4A illustrates the emitter(s) 124 coupled to the bracket 300 (e.g., a first bracket) and FIG. 4B illustrates the receiver(s) 126 coupled to the bracket, (e.g., a second bracket). In FIG. 4A, the emitter(s) 124 are shown including the emitter(s) 124(1)-(4), and are arranged to output the signals 132 in a signal direction 400, towards the receiver(s) 126. In FIG. 4B, the receiver(s) 126 are shown including the receiver(s) 126, and are arranged to receive the signals 132 from the emitter(s) 124.

Figure 5A:
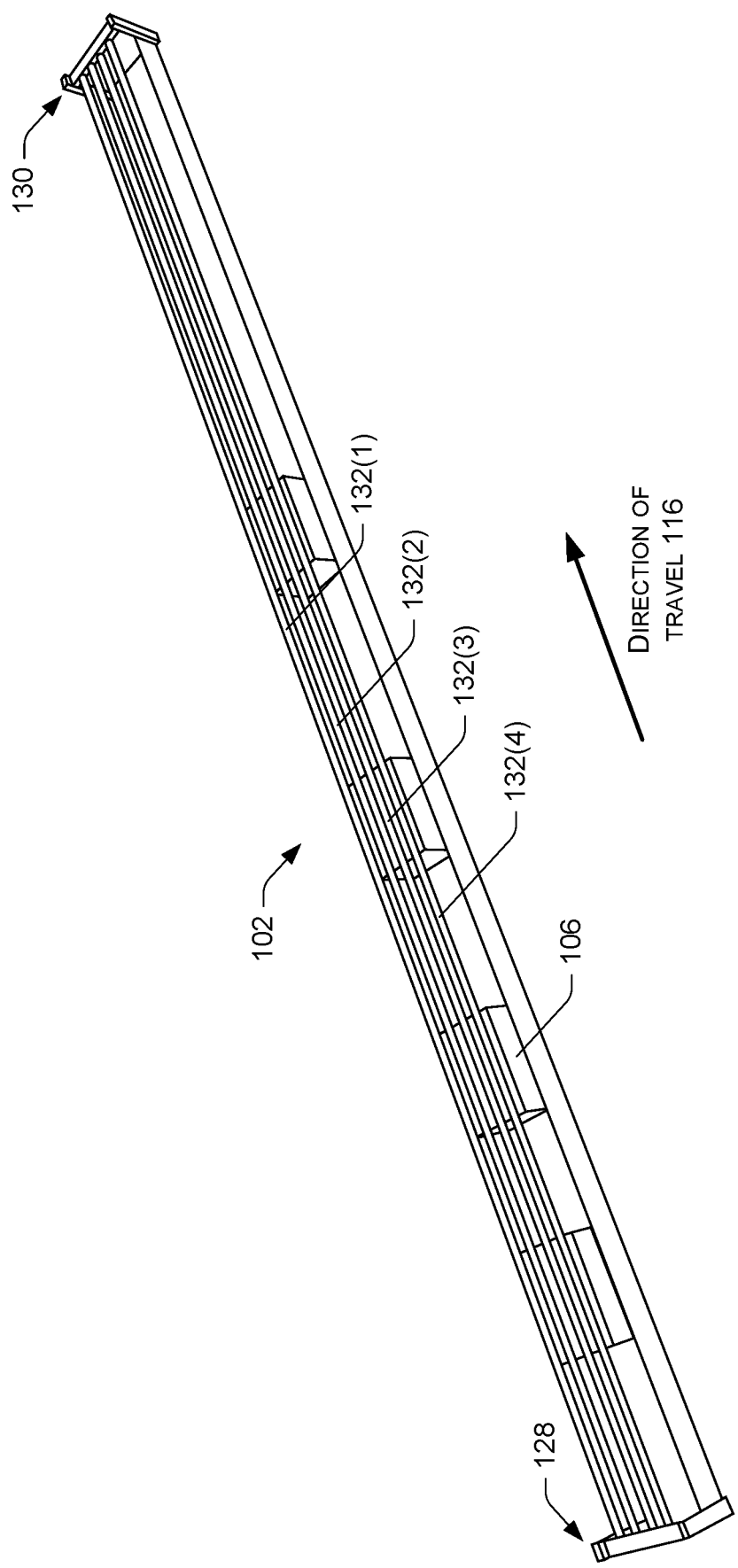
FIG. 5A illustrates a first perspective view of an example conveyor system, showing packages being properly positioned on the conveyor system, according to an embodiment of the present disclosure.
Figure 5B:
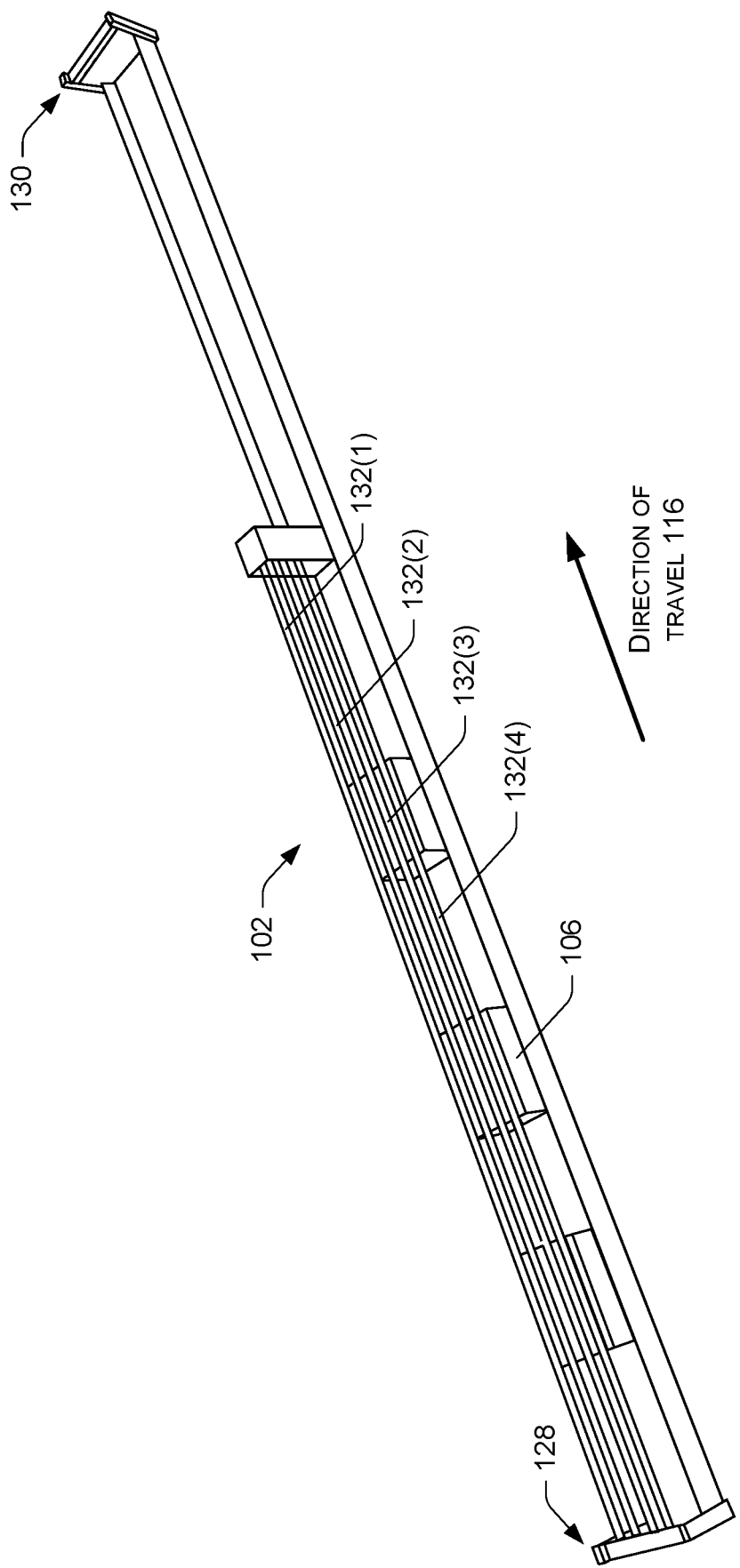
FIG. 5B illustrates a second perspective view of an example conveyor system, showing packages being improperly properly positioned on the conveyor system, according to an embodiment of the present disclosure.

FIG. 5A and FIG. 5B illustrate perspective views of the conveyor system 102, which may span between the first end 128 and the second end 130. Emitter(s) 124 (such as the emitter(s) 124(1)-(4)) are arranged to output the signals 132 towards the receiver(s) 126 (such as the receiver(s) 126(1)-4)). As shown, the signals 132 may include the signals 132(1)-(4).

In FIG. 5A, packages 106 located on the conveyor system 102 may be properly positioned such that the packages 106 do not extend beyond an envelope associated with the conveyor system 102. For example, the envelope may be associated with a ceiling height (e.g., the height 200), and when the packages 106 are located beneath the ceiling height, the packages 106 may be properly positioned on the conveyor system 102. In such instances, the signals 132(1)-(4) may be respectively received by the receiver(s) 126.

Comparatively, in FIG. 5B, the packages 106 located on the conveyor system 102 may not be properly positioned. Here, the packages 106 may extend beyond the envelope associated with the conveyor system 102, such as being above the height 200. For example, the packages 106 may become flipped on their ends, shuffled, stacked together, and so forth. In such instances, the signals 132 are obstructed from reaching the receiver(s) 126 at the second end 130. In response, the monitoring component 138 may determine that the emitted signals 132 (or a portion thereof) were not received by the receiver(s) 126, and accordingly, undertake one or more action(s) (e.g., halt movement of the conveyor system 102, provide a warning, and so forth). Although FIG. 5B illustrates that all of the signals 132 are obstructed from reaching the receiver(s) 126, respectively, it is to be understood that in some instances, less than all of the signals 132 may be obstructed by the packages 106.

Figure 6:
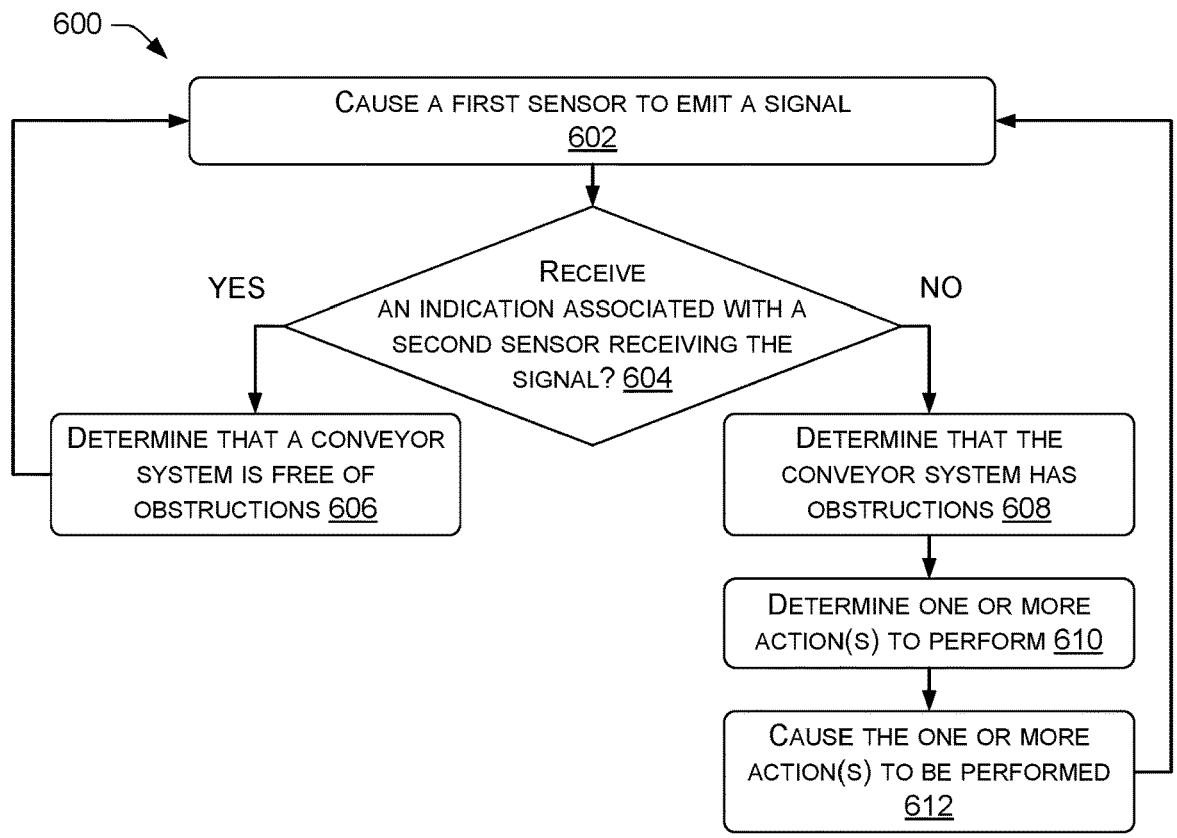
FIG. 6 illustrates an example process for determining whether packages located on a conveyor system are improperly positioned, according to an embodiment of the present disclosure.

FIGS. 5 and 6 illustrate various processes related to monitoring a conveyor system for improperly positioned bins and/or packages, or more generally, items that are transported by the conveyor system. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4, although the processes may be implemented in a wide variety of other environments, architectures and systems.

FIG. 6 illustrates an example process 600 for monitoring bins and/or packages on a conveyor system (e.g., the conveyor system 102) for determining whether the bins and/or the packages are improperly positioned, are at risk of falling, and/or are at risk of jamming the conveyor system.

At 602, the process 600 may include causing a first sensor to emit a signal. For example, the first sensor may represent an emitter that emits a signal. In some instances, the control system 104 (such as the processor(s) 118), may cause the first sensor to emit the signal according to predetermined rates, intervals, and so forth. The emitter may include, for example, a IR emitter than emits a light signal. The first sensor may be arranged to output the signal in a direction along a longitudinal length of the conveyor system, parallel, or in the same direction as the flow of packages on the conveyor system.

At 604, the process 600 may include determining whether an indication is received associated with a second sensor receiving the signal. For example, the second sensor may represent a receiver that is aligned with the first sensor to receive the signal. Whether the second sensor receives the first signal is dependent upon a lack of obstructions along the length of the conveyor system. For example, if there are no obstructions (e.g., the bins and/or packages are located below a ceiling height of the conveyor system), then the second sensor may receive the signal. Comparatively, if there are obstructions, (e.g., the bins and/or the packages are located at least partially above the ceiling height), then the second sensor may not receive the signal. That is, the signal may be block by the bins and/or the packages. In instances where the second sensor receives the signal, an indication of such may be recorded to know that the bins and/or the packages are properly positioned. Comparatively, if the second sensor does not receive the signal, an indication of such may be recorded to know that the bins and/or the packages are improperly positioned. The control system 104 therefore collects sensor data associated with the signals, knowing when the signals were transmitted by the emitters and whether the signals are received by the receivers. If at 604 the process 600 determines that the indication was received, the process 600 may follow the "YES" route and proceed to 606.

At 606, the process 600 may determine that the conveyor system is free of obstructions. For example, based at least in part on receiving the signal, the control system 104 may determine that there are no bins and/or packages (or other objects), that extend beyond a ceiling of the conveyor system (e.g., within the envelope). This may be indicative of the bins and/or packages being properly positioned on the conveyor system and accordingly, are not at risk of falling off the conveyor system and/or jamming the conveyor system. From 606, the process 600 may loop to 602, whereby the process 600 may continue to cause the first sensor to emit signals for use in determining whether the bins and/or the packages are improperly positioned on the conveyor system.

Comparatively, if at 604 the second sensor did not receive the signal, the process 600 may follow the "NO" route to 608. At 608, the process 600 may determine that the conveyor system has obstructions. For example, in instances where the signal was not received, one or more bins and/or packages may extend beyond the ceiling height above the conveyor system. In some instances, the process 600 may wait for a predetermined amount of time before determining that the signal was not received. These bins and/or packages may be at risk of falling from the conveyor system and/or causing injury. Following this determination, the process 600 may proceed to 610 whereby the process 600 may determine one or more action(s) to perform. The action(s), when performed, may serve to increase a safety of an environment in which the conveyor system resides, such as reducing a likelihood that the bins and/or the packages may fall from the conveyor system. In some instances, the action(s) may include halting a movement of the conveyor system, slowing a movement of the conveyor system, providing alerts or notifications, instructing a robotic arm to reposition the bins and/or packages, and so forth. In some instances, the specific action(s) may be determined based at least in part on the number of bins and/or packages improperly positioned, a size (e.g., length, width, etc.) of the conveyor system, a location of the conveyor system within the environment, and so forth.

At 612, the process 600 may cause the one or more action(s) to be performed. For example, the control system 104 may communicate with the conveyor system 102 for halting movement. The conveyor system 102 may include a programmable logic controller (PLC) for receiving such commands and halting, or otherwise controlling, a movement of the conveyor system 102. Additionally, or alternatively, the control system 104 may communicate with a device of a personnel within the environment, such as a tablet, requesting that the personnel reposition the bins and/or the packages. From 612, the process 600 may loop to 602 so as to cause the first sensor to emit signals for use in determining whether the bins and/or the packages are improperly positioned on the conveyor system.

Although the process 600 describes causing a single signal to be emitted by a single emitter, and determining whether that signal is received, the process 600 may coordinate the transmission of a plurality of signals by a plurality of emitters, respectively. A plurality of receivers may be arranged to receive the plurality of signals, respectively. For example, the process 600 may coordinate the transmission of eight signals by eight emitters. Here, the process 600 may determine whether those eight signals were received by respective receivers. If a portion or all of the signals were received, the process 600 may determine that there are no obstructions. However, if a portion or all of the signals were not received, the process 600 may determine that there are obstructions, and consequently, may cause one or more action(s) to be performed. In some instances, the process 600 may perform the action(s) based on a number of the signals that were not received. For example, if eight signals are emitted and only one is not received, the process 600 may not halt a movement of the conveyor system. However, if a threshold of signals are not received, such as four, then the process 600 may determine to halt movement of the conveyor system, for example.

Further, although the process 600 is described as monitoring whether bins and/or packages become improperly positioned and extend above a ceiling height of the conveyor system, additionally or alternatively, sensor(s) may monitor whether the bins and/or packages extend beyond sides of the conveyor system. For example, additional sensor(s) may monitor whether the bins and/or the packages overhang or otherwise extend over edges of the conveyor system. In such instances, the action(s) may be performed to prevent the bins and/or the packages falling from the conveyor system and/or jamming the conveyor system.

Figure 7:
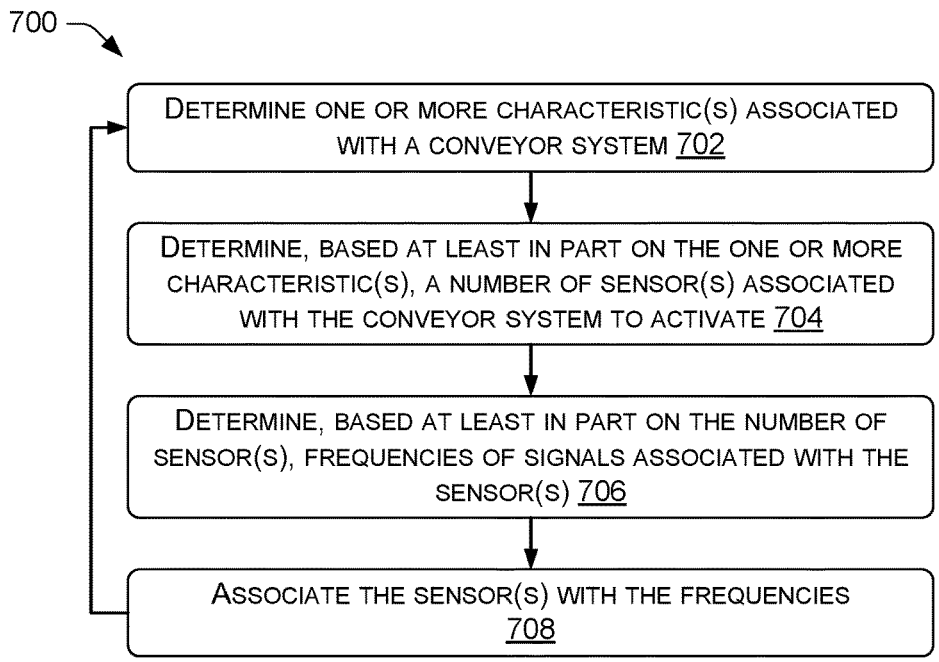
FIG. 7 illustrates an example process for determining characteristic(s) associated with a conveyor system and programming one or sensor(s) to monitor packages on the conveyor system, according to an embodiment of the present disclosure.

FIG. 7 illustrates an example process 700 for determining frequencies associated with sensor(s) 122 of the control system 104.

At 702, the process 700 may include determining one or more characteristic(s) associated with a conveyor system. For example, the control system 104 or the remote system 150 may determine characteristic(s) of the conveyor system, such as a size of the conveyor system (e.g., width, length, etc.), a size of packages transported by the conveyor system, a type of packages transported by the conveyor system (e.g., envelopes, parcels, crates, etc.), a shape or trajectory of the conveyor system (e.g., straight, curved, etc.), a type of the conveyor system (e.g., belt, roller, wheel, etc.), a location of the conveyor system within an environment (e.g., overhead, ground, aerial, wall, multi-level, etc.), and so forth.

At 704, the process 700 may include determining, based at least in part on the one or more characteristic(s), a number of sensor(s) associated with the conveyor system to activate. For example, the control system may include any number of sensor(s) arranged to monitor the conveyor system (e.g., eight), but in some instances, only a portion of these sensor(s) may be activated to emit and receive signals, respectively. That is, in some instances, the control system may include a greater number of sensor(s) than are necessary for monitoring the conveyor system. However, the number of sensor(s) activated may be dynamically determined based at least in part on the one or more characteristic(s). As an example, for smaller packages, or for a conveyor system that is configured to convey smaller packages, the number of sensor(s) activated may be increased, as compared to larger packages in which a lesser number of sensor(s) may be activated. In such instances, the greater number of sensor(s) activated may increase an accuracy or precision in detecting bins and/or packages that extend beyond an envelope associated with the conveyor system.

At 706, the process 700 may include determining, based at least in part on the number of sensor(s), frequencies of signals associated with the sensor(s). For example, the control system may determine frequencies to be used by the emitters for transmitting the signals to reduce noise detected by the receiver(s). In some instances, a number of disparate frequencies utilized may be based at least in part on the number of sensor(s). For example, adjacent sensor(s) may include different frequencies, whereas sensor(s) that are not located immediately adjacent to one another, for example, may include the same frequency.

At 708, the process 700 may include associating the sensor(s) with the frequencies.

Associating the emitter(s) and the receiver(s) with the frequencies, respectively, permits the control system to determine whether a pair of emitter(s) and receiver(s) emitted and received a signal, respectively. That is, if a receiver receives a signal, but the signal has a different frequency than the emitter to which the receiver is associated with, the control system may determine that the receiver did not receive a signal with the proper frequency.

Although the process 600 is discussed with regard to determining frequencies associated with the sensors, in some instances, other features or characteristics of the sensors may be altered. For example, signals may include phase shifts or other information may be encoded within the signals emitted by the sensor. This may accordingly be used to determine whether the receiver(s) receive signals emitted by the emitter(s), respectively.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   a first emitter;
   a second emitter;
   a first receiver associated with the first emitter;
   a second receiver associated with the second emitter;
   one or more processors; and
   one or more non-transitory computer-readable media storing computer-executable instructions that, when executed by the one or more processors, cause the one or more processors to perform acts comprising:
      causing the first emitter to emit a first infrared (IR) signal in a direction that is substantially parallel to a longitudinal length of a conveyor transporting parcels, the first IR signal having a first frequency;
      causing the second emitter to emit a second IR signal in the direction that is substantially parallel to the longitudinal length of the conveyor, the second IR signal having a second frequency that is different than the first frequency;
      determining at least one of:
         a lack of receipt of the first IR signal by the first receiver, or
         a lack of receipt of the second IR signal by the second receiver; and
      causing a movement of the conveyor to be halted based on the at least one of the lack of receipt of the first IR signal by the first receiver or the lack of receipt of the second IR signal by the second receiver.

2. The system of claim 1, wherein:
   the first emitter and the second emitter are disposed at a first end of the conveyor; and
   the first receiver and the second receiver are disposed at a second end of the conveyor, the second end being spaced apart from the first end in the direction along the longitudinal length of the conveyor.

3. The system of claim 1, wherein the first emitter, the second emitter, the first receiver, and the second receiver are disposed vertically above the conveyor.

4. The system of claim 1, further comprising a third emitter and a third receiver associated with the third emitter, the acts further comprising:
   causing the third emitter to emit a third IR signal in a second direction that is substantially perpendicular to the longitudinal length of the conveyor;
   determining a lack of receipt of the third IR signal by the third receiver; and
   causing the movement of the conveyor to be halted based at least in part on the lack of receipt of the third IR signal by the third receiver.

5. A method comprising:
   causing a first sensor to emit a first signal in a direction along a longitudinal length of a conveyor;
   causing a second sensor to emit a second signal in the direction along the longitudinal length of the conveyor;
   determining at least one of:
      a lack of receipt of the first signal by a third sensor, or
      a lack of receipt of the second signal by a fourth sensor;
   determining, based at least in part on the at least one of the lack of receipt of the first signal or the lack of receipt of the second signal, that an obstruction is present along the conveyor;
   determining one or more actions associated with resolving the obstruction; and
   causing performance of the one or more actions.

6. The method of claim 5, wherein the one or more actions comprise at least one of:
   causing a movement of the conveyor to be halted;
   causing a speed of the conveyor to be altered;
   causing a notification to be output;
   causing a robotic arm to actuate; or
   sending an indication associated with the obstruction to a device.

7. The method of claim 5, further comprising:
   causing the first sensor to emit a third signal;
   determining that the third signal is received by the third sensor;
   determining, based at least in part on the third sensor receiving the third signal, that the obstruction is no longer present; and
   causing movement of the conveyor to be altered.

8. The method of claim 5, further comprising:
   causing a fifth sensor to emit a third signal in a second direction that is substantially perpendicular to the longitudinal length of the conveyor; and
   determining whether a sixth sensor received the third signal,
   wherein determining that the obstruction is present along the conveyor is further based at least in part on whether the sixth sensor received the third signal.

9. The method of claim 5, wherein:
   the first signal is associated with a first frequency; and
   the second signal is associated with a second frequency that is different than the first frequency.

10. The method of claim 5, wherein:
    the first sensor and the second sensor are spaced apart from one another in a second direction transverse to the longitudinal length of the conveyor; and
    the third sensor and the fourth sensor are spaced apart from one another in the second direction transverse to the longitudinal length of the conveyor.

11. The method of claim 5, wherein:
    the first sensor is disposed vertically above the conveyor, at a first end of the conveyor;
    the second sensor is disposed one of vertically above the conveyor or along a side of the conveyor, at the first end;
    the third sensor is disposed vertically above the conveyor, at a second end of the conveyor that is spaced apart from the first end in the direction along the longitudinal length; and the fourth sensor is disposed on of vertically above the conveyor or along the side of the conveyor, at the second end.

12. The method of claim 5, further comprising:
determining one or more characteristics associated with the conveyor, the one or more characteristics comprising at least one of:
   a length of the conveyor;
   a width of the conveyor;
   a size of items or containers transported by the conveyor; or
   a location of the conveyor within an environment; and
determining, based at least in part on the one or more characteristics, a number of sensors to actuate for monitoring the conveyor.

13. The method of claim 5, wherein at least one of the first signal or the second signal is substantially parallel to a deck of the conveyor, the deck being used to transport items or containers.

14. A system comprising:
   one or more processors; and
   one or more non-transitory computer-readable media storing computer-executable instructions that, when executed by the one or more processors, cause the one or more processors to perform acts comprising:
      receiving a first indication associated with a first sensor emitting a signal, the signal being emitted in a direction that is along a flow path associated with a conveyor, the first sensor being coupled to a frame of the conveyor;
      receiving a second indication associated with a second sensor failing to receive the signal, the second sensor being spaced apart from the first sensor in the direction along the flow path, the second sensor being coupled to the frame of the conveyor; and
      causing, based at least in part on receiving the second indication, a movement of the conveyor to be altered.

15. The system of claim 14, wherein causing the movement of the conveyor to be altered comprises sending an instruction to a device associated with the conveyor, the instruction causing the conveyor to at least one of halt movement or decrease a rate of the movement.

16. The system of claim 14, the acts further comprising:
receiving a third indication associated with the first sensor emitting a second signal, the second signal being emitted after the signal;
receiving a fourth indication associated with the second sensor receiving the second signal; and
causing, based at least in part on receiving the fourth indication, the movement of the conveyor to be altered.

17. The system of claim 14, the acts further comprising:
receiving a third indication associated with a third sensor emitting a second signal, the second signal being emitted in the direction that is along the flow path; and
receiving a fourth indication associated with a fourth sensor failing to receive the second signal or receiving the second signal,
wherein causing the movement of the conveyor to be altered is further based at least in part on the fourth indication.

18. The system of claim 17, the acts further comprising:
determining a first frequency for the signal;
determining a second frequency for the second signal that is different than the first frequency;
associating the first sensor and the second sensor with the first frequency; and
associating the third sensor and the fourth sensor with the second frequency.

19. The system of claim 14, the acts further comprising based at least in part on receiving the second indication, at least one of:
   causing one or more notifications to be output in an environment in which the conveyor resides;
   sending an instruction to a device associated with a personnel in the environment; or
   causing a robotic arm to actuate for resolving an obstruction on the conveyor.

20. The system of claim 14, the acts further comprising:
receiving a third indication associated with a third sensor emitting a second signal, the second signal being emitted in a second direction that is transverse to the flow path; and
receiving a fourth indication associated with a fourth sensor one of failing to receive the second signal or receiving the second signal,
wherein causing the movement of the conveyor to be altered is further based at least in part on the fourth indication.

* * * * *